US012503135B2

(12) United States Patent
Goodell

(10) Patent No.: US 12,503,135 B2
(45) Date of Patent: Dec. 23, 2025

(54) LOCALIZATION ALGORITHM

(71) Applicant: TORC Robotics, Inc., Blacksburg, VA (US)

(72) Inventor: Matthew Goodell, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 258 days.

(21) Appl. No.: 18/334,092

(22) Filed: Jun. 13, 2023

(65) Prior Publication Data

US 2024/0416948 A1 Dec. 19, 2024

(51) Int. Cl.
| | | |
|---|---|---|
| *B60W 60/00* | (2020.01) | |
| *B60W 50/00* | (2006.01) | |
| *B60W 50/06* | (2006.01) | |
| *G06T 5/10* | (2006.01) | |
| *G06T 5/20* | (2006.01) | |
| *G06T 5/50* | (2006.01) | |

(Continued)

(52) U.S. Cl.
CPC .......... *B60W 60/001* (2020.02); *B60W 50/06* (2013.01); *G06T 5/10* (2013.01); *G06T 5/20* (2013.01); *G06T 5/50* (2013.01); *G06T 5/70* (2024.01); *G06T 7/74* (2017.01); *B60W 2050/0052* (2013.01); *B60W 2300/12* (2013.01); *B60W 2420/403* (2013.01); *B60W 2556/40* (2020.02); *G06T 2207/20212* (2013.01); *G06T 2207/30252* (2013.01)

(58) Field of Classification Search
CPC .... G06T 5/10; G06T 5/20; G06T 5/50; G06T 5/60; G06T 5/70; G06T 7/30; G06T 7/33; G06T 7/70; G06T 7/74; G06T 2207/20182; G06T 2207/20212; G06T 2207/30236; G06T 2207/30252; G06T 2207/30256; G06T 2207/30261; G01S 13/89; G01S 13/93; G01S 13/931; B60W 50/06; B60W 60/001; B60W 2050/0052; B60W 2300/12; B60W 2556/40; B60W 2420/403; B60W 2420/408; G01C 21/165; G01C 21/1656; G01C 21/26; G01C 21/30; G01C 21/32
See application file for complete search history.

(56) References Cited

U.S. PATENT DOCUMENTS

| | | | | |
|---|---|---|---|---|
| 8,612,135 | B1 * | 12/2013 | Montemerlo | G05D 1/0246 701/450 |
| 10,289,115 | B2 * | 5/2019 | Hilnbrand | G05D 1/0257 |

(Continued)

*Primary Examiner* — Brandon Z Willis
(74) *Attorney, Agent, or Firm* — Armstrong Teasdale LLP

(57) ABSTRACT

Embodiments herein include an automated vehicle performing localization functions using particle scoring and particle filters. The automated vehicle performs a phase correlation operation that transforms image data of a sensed map and pre-stored base map from a spatial to frequency domain and combines the transformed maps to generate image data of a correlation map. Estimated location information of particles are compared against sensed data or other data in sensed sub-maps or the correlation map. The automated vehicle may apply an image-convolution scoring map by combining image data of the sensed and base maps in the spatial domain. The autonomy system may calculate entropies for the correlation map and image-convolution scoring map and combines these maps based upon the respective entropies.

20 Claims, 4 Drawing Sheets

(51) Int. Cl.
*G06T 5/70* (2024.01)
*G06T 7/73* (2017.01)

(56) References Cited

U.S. PATENT DOCUMENTS

| | | | |
|---|---|---|---|
| 10,838,065 B2 * | 11/2020 | Olson | G06T 11/206 |
| 2018/0045521 A1 * | 2/2018 | Wege | G01C 21/3896 |
| 2020/0333798 A1 * | 10/2020 | Losh | G01S 13/931 |
| 2023/0043716 A1 * | 2/2023 | Hotson | G06F 18/22 |
| 2024/0168480 A1 * | 5/2024 | Varadarajan | G05D 1/644 |

* cited by examiner

LOCALIZATION ALGORITHM

TECHNICAL FIELD

This application generally relates to managing operations of automated vehicles, including localization functions for localizing an automated vehicle using sensor data and one or more types of particle filters.

BACKGROUND

Particle filters are a popular technique used in automated vehicle localization. An automated vehicle uses a particle filter function to score "particles" representing an estimate of the automated vehicle's position and orientation relative to a known map. The process involves generating and updating the particles using the particle filter, the known map, and the sensor data. Localization functions often apply scoring techniques for intensity of reflectivity and height for localizing the automated vehicle. However, these scoring techniques can suffer from issues such as artifacts or aliasing. A number of factors may cause artifacts, including noise in the image, poor image quality, or even the limitations of the imaging hardware itself. Additionally, roads with faint or no features can lead to difficulties in scoring particles and potential loss of localization. This can be particularly challenging when dealing with low-visibility conditions such as rain, snow, and fog. What is needed is an improved means for applying particle filters in localization functions.

SUMMARY

In order to overcome these challenges, embodiments described herein include localization functions of autonomy systems of automated vehicles that implement improved ways for applying particle filters and scoring particles. An automated vehicle implements hardware and software components for Scoring particles using a pHase coRrElation Kernel (SHREK), which implements phase correlation operations for applying a particle filter function in localization. These techniques use a specialized kernel to analyze the phase information of the base and sensor map, in addition or as an alternative to a traditional scoring technique based on convolutions of image data in a spatial domain. The SHREK function generates a combined scoring map by algorithmically combining image data of a sensed map in a frequency domain generated from sensor data of the automated vehicle and the image data of a stored base map in the frequency domain. The map localizer scores each particle by, for example, comparing location information or other types of data at the particle against sensed data in the sensed map, one or more sensed sub-maps, or the combined map. Embodiments may implement particle scoring using a phase correlation approach based on entropy values (such phase correlation function is sometimes referred to as "SHREK 2"). By incorporating phase information into the scoring process, SHREK and SHREK 2 are able to more accurately identify and score particles, even in challenging conditions. In SHREK 2, the autonomy system of the automated vehicle algorithmically combining image data of a sensed map in the frequency domain with the image data of the base map in the frequency domain. The autonomy system may also algorithmically combine the image data of the sensed map of a sensed map in a spatial domain with the image data of the base map in the spatial domain. In SHREK 2, the autonomy system calculates the respective entropies of each of the combined scoring maps and combines the scoring maps to generate the image data of a merged map by weighting the entropies at each pixel of the image data.

In an embodiment, a method for managing location information in automated vehicles, the method comprising generating, by a processor of an automated vehicle, a sensed map based upon sensor data from one or more sensors of the automated vehicle; obtaining, by the processor, a base map from a non-transitory storage medium; generating, by the processor, a first scoring map based upon image data of the sensed map in a spatial domain overlaying the image data of the base map in the spatial domain; applying, by the processor, a transform function on the image data of the sensed map to generate the image data of a transformed sensed map in a frequency domain, and on the image data of the base map to generate the image data of a transformed base map in the frequency domain; generating, by the processor, a second scoring map in the frequency domain based upon the image data of the transformed sensed map overlaying the image data of the transformed base map; and updating, by the processor, an estimated location of the automated vehicle, by applying at least one of the first scoring map or the second scoring map against a plurality of particles representing estimated locations of the automated vehicle.

In another embodiment, a system for managing location information in automated vehicles, comprising one or more sensors of an automated vehicle for generating sensor data; and a processor coupled to the one or more sensors and configured to: generate a sensed map based upon sensor data from the one or more sensors; obtain a base map from a non-transitory storage medium; generate a first scoring map based upon image data of the sensed map in a spatial domain overlaying the image data of the base map in the spatial domain; apply a transform function on the image data of the sensed map to generate the image data of a transformed sensed map in a frequency domain, and on the image data of the base map to generate the image data of a transformed base map in the frequency domain; generate a second scoring map in the frequency domain based upon the image data of the transformed sensed map overlaying the image data of the transformed base map; and update an estimated location of the automated vehicle, by applying at least one of the first scoring map or the second scoring map against a plurality of particles representing estimated locations of the automated vehicle.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views. The accompanying drawings, which are incorporated in and constitute a part of this specification, illustrate various exemplary embodiments and together with the description, serve to explain the principles of the disclosed embodiments.

DETAILED DESCRIPTION

Figure 1:
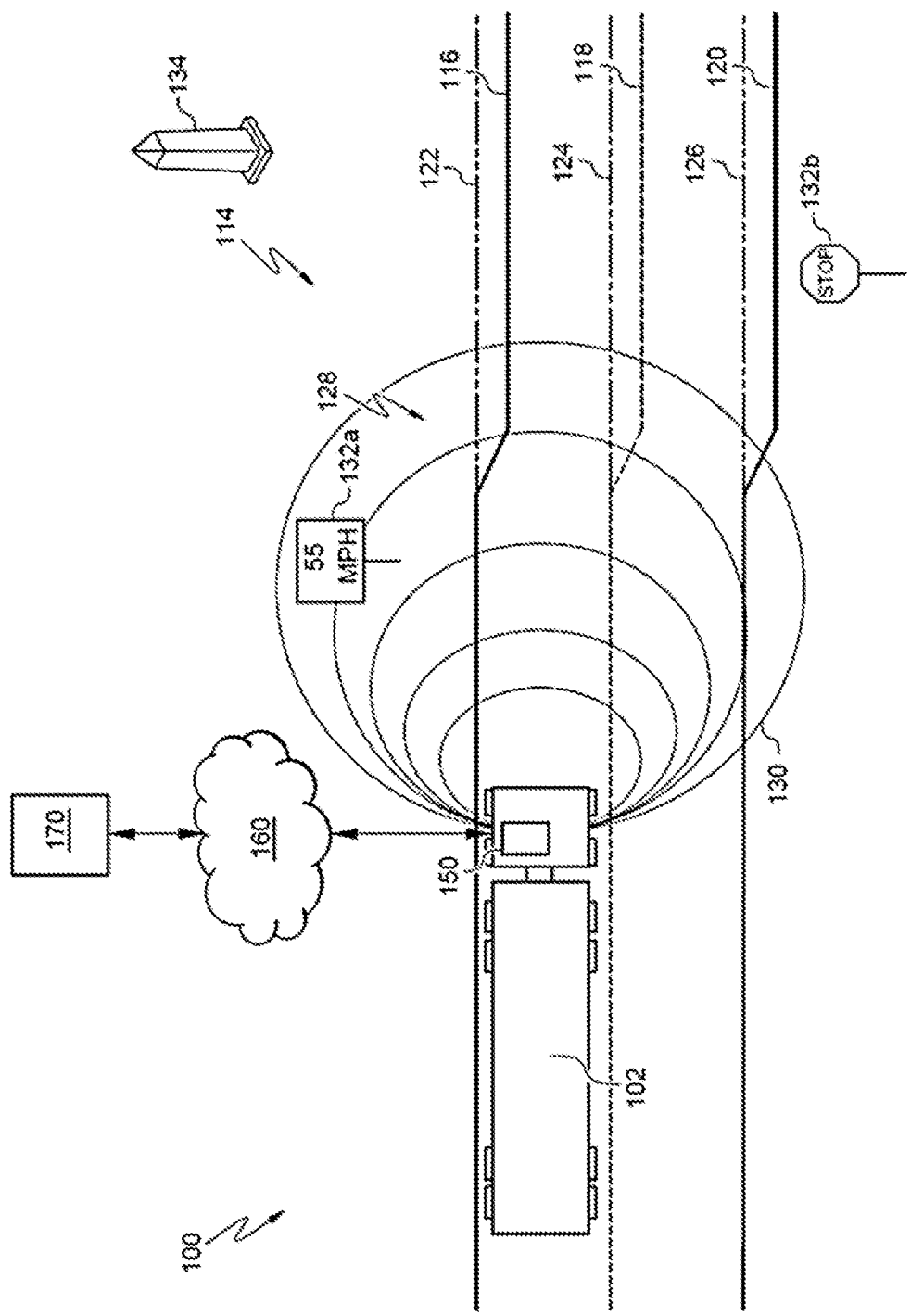
FIG. 1 is a bird's eye view of a roadway environment including a schematic representation of an automated vehicle and aspects of an autonomy system of the autonomous truck, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments described herein relate to automated vehicles having computer-driven automated driver systems (sometimes referred to as "autonomy systems"). The automated vehicle may be completely autonomous (fully-autonomous), such as self-driving, driverless, or SAE Level 4 autonomy, or semi-autonomous, such as SAE Level 3 autonomy. As used herein the terms "autonomous vehicle" and "automated vehicle" includes both fully-autonomous and semi-autonomous vehicles. The present disclosure sometimes refers to automated vehicles as "ego vehicles."

Generally, autonomy systems of automated vehicles are logically structured according to three pillars of technology: 1) perception; 2) maps/localization; and 3) behaviors, planning, and control.

The function of the perception aspect is to sense an environment surrounding the automated vehicle by gathering and interpreting sensor data. To interpret the surrounding environment, a perception module or engine in the autonomy system may identify and classify objects or groups of objects in the environment. For example, a perception module associated with various sensors (e.g., LiDAR, camera, radar, etc.) of the autonomy system may identify one or more objects (e.g., pedestrians, vehicles, debris, etc.) and features of a roadway (e.g., lane lines) around the automated vehicle, and classify the objects in the road distinctly.

The maps/localization aspect (sometimes referred to as a "map localizer") of the autonomy system executes map localization functions (sometimes referred to as "MapLoc" functions). The map localization functions determine the current location of the automated vehicle within a pre-established and pre-stored digital map. A technique for map localization is to sense the environment surrounding the automated vehicle (e.g., via the perception system) and to correlate features of the sensed environment with details (e.g., digital representations of the features of the sensed environment) on the digital map. After the systems of the autonomy system have determined the location of the automated vehicle with respect to the digital map features (e.g., location on the roadway, upcoming intersections, road signs), the automated vehicle can plan and execute maneuvers and/or routes with respect to the features of the digital map.

The behaviors, planning, and control aspects of the autonomy system to make decisions about how an automated vehicle should move or navigate through the environment to get to a calculated goal or destination. For instance, the behaviors, planning, and control components of the autonomy system consumes information from the perception engine and the maps/localization modules to know where the ego vehicle is relative to the surrounding environment and what other traffic actors are doing. The behaviors, planning, and control components may be responsible for decision-making to ensure, for example, the vehicle follows rules of the road and interacts with other aspects and features in the surrounding environment (e.g., other vehicles) in a manner that would be expected of, for example, a human driver. The behavior planning may achieve this using a number of tools including, for example, goal setting (local/global), implementation of one or more bounds, virtual obstacles, and using other tools.

The automated vehicle includes hardware and software components of an autonomy system having a map localizer. The autonomy system ingests, gathers, or otherwise obtains (e.g., receives, retrieves) various types of data, which the autonomy system feeds to the map localizer. The autonomy system applies the map localization operations on the gathered data to locate and navigate the automated vehicle. The gathered data may include live data from sensors and pre-stored data, stored in non-transitory data storage, such as a stored digital map. Using the gathered data, the map localizer applies the map localization to estimate the vehicle location within a mapped locale.

The autonomy system generates a sensed map using perception sensor data, such as the current LiDAR sensor data. The map localizer matches (e.g., compares and aligns) the sensed map of the current LiDAR sensor data against a pre-stored base map, using multiple evaluation methods and according to a particle filter. The map localizer may generate two (or more) local sensed sub-maps based upon corresponding attributes of the LiDAR data (or other sensor data), iteratively accumulated around the automated vehicle over short interval time periods. For instance, a first sub-map includes a sensed map of reflective intensity measurements, and a second sub-map includes a sensed map of height measurement data. The localization functions apply scoring or localization operations on various types of general image data that is shared between a base map and a sensed map. Embodiments descried herein reference using intensity and/or height for maps and localization, though other types of image data information could be employed.

The map localizer generates a plurality of particles, representing estimated locations of the automated vehicle in the sensed map, a particular sub-map, or the base map. A particle filter is a technique for automated vehicle localization, executed by the map localization functions of the map localizer. The map localizer uses the particle filter to estimate, for example, the automated vehicle's position and orientation relative to a known pre-stored base map, given some amount of noisy sensor data. The localization process involves generating the particles as two-dimensional coordinates representing the estimated location of the automated vehicle and updating the particles using the particle filter. The process for the autonomous vehicle to generate the particles and apply the particle filter for localization includes operations for initializing, predicting, updating, resampling, and estimating outputs.

The scoring techniques for the intensity pipeline and height pipeline provide the types of data outputted by the map localizer when applying the map localization functions. However, the pipelines can sometimes suffer from issues, such as artifacts or aliasing. These artifacts are the result of a number of factors, such as noise in the image data of the sensed map or sub-map, poor image quality in the sensed map or sub-map, and limitations of the imaging hardware (e.g., LiDAR sensor), among others. Additionally, roads with faint or no features can lead to difficulties in scoring particles. The scoring functions of the pipelines can be particularly challenging when dealing with low-visibility conditions, such as rain, snow, and fog.

Embodiments described herein provide improved means for generating scoring maps used when executing particle filters. To overcome these challenges, the map localizer or other aspects of the autonomy system execute improved function for scoring the particles by applying "Scoring with a pHase coRrElation Kernel (SHREK)" function for developing a scoring map for the particle filter. In some embodiments, the autonomy system applies an improved SHREK function ("SHREK2") that takes entropy as an inputted consideration for generating another type of scoring map that combines a standard image convolution-based scoring map and a frequency-based scoring map. The SHREK and SHREK2 functions described herein apply a specialized kernel or function for analyzing phase information of image data of the base map and sensor map, rather than the traditional scoring technique based on convolutions. By incorporating the phase information into the scoring process, SHREK and SHREK 2 are able to more accurately identify and score the particles, even in challenging conditions.

FIG. 1 is a bird's eye view of a roadway environment 100 including a schematic representation of an automated vehicle (shown as an autonomous, tractor-trailer truck 102) and aspects of an autonomy system 150 of the autonomous truck 102, according to an embodiment. The roadway environment 100 includes various objects located at or nearby a road 114 of the roadway environment 100 and characteristics of the road 114, such as lane lines 116, 118, 120 and a bend 128 in the road 114. The objects include the autonomous truck 102 (sometimes referred to as an "ego" or "ego vehicle"), road signs 132a, 132b and the landmark 134.

Moreover, FIG. 1 shows aspects of the autonomy system 150 of the autonomous truck 102 for modifying one or more actions of the truck 102, such as driving or navigating instructions. The truck 102 includes hardware and software components allowing the autonomy system 150 to communicate wirelessly with a remote server 170 via one or more networks 160. The truck 102 and autonomy system 150 need not necessarily connect with the network 160 or server 170 while in operation (e.g., driving down the roadway). The server 170 is remotely situated from the truck 102 (e.g., not at the truck 102), and the truck 102 may deploy with all the necessary perception, localization, and vehicle control software and data necessary to complete its mission fully-autonomously or semi-autonomously.

The autonomy system 150 of the autonomous truck 102 captures various types of data about the environment 100 and generates the driving instructions for navigating or otherwise operating the autonomous truck 102. The autonomy system 150 of truck 102 may be completely autonomous (fully-autonomous), such as self-driving, driverless, or SAE Level 4 autonomy, or semi-autonomous, such as Level 3 autonomy. As used herein the term "autonomous" includes both fully-autonomous and semi-autonomous. While the description of FIG. 1 refers to the automated vehicle as the truck 102 (e.g., tractor trailer), the automated vehicle in possible embodiments could be any type of vehicle, including an automobile, a mobile industrial machine, or the like. While the disclosure discusses automated vehicles having a self-driving or driverless autonomy system, the autonomy system in possible embodiments could be semi-autonomous, where the autonomy system provides varying degrees of autonomy or autonomous functionality. In some embodiments, various types of data or software components of the autonomy system may be stored or executed by the remote server 170, which the remote server 170 reports back to the autonomy system 150 of the truck 102 via the network 160.

The autonomy system 150 may be logically structured on at least three aspects of automated vehicle technology: (1) perception technology aspects ("perception module"), (2) maps/localization technology aspects ("map localizer"), and (3) behaviors, planning, and control technology aspects ("operation engine"). The function of the perception technology aspects is to sense an environment surrounding truck 102 and interpret sensor data. To interpret the surrounding environment 100, the perception engine or module of the autonomy system 150 of the truck 102 may identify and classify objects or groups of objects in the environment 100. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102, and classify the objects in the road distinctly.

The map localizer of the autonomy system 150 includes software programming that determines where the truck 102 is currently located within the context of a pre-established and pre-stored digital map. The perception module gathers data to sense the environment 100 surrounding the truck 102 and the map localizer correlates features of the sensed environment against details on the digital map (e.g., digital representations of the features of the sensed environment).

The map localizer receives the sensor data and measurements from the perception module or from external data sources, such as obtaining the digital map from non-transitory machine-readable storage of the truck 102 or at the remote server 107. The map localizer generates the sensed maps based upon the sensor data received from optical sensors of the truck 102. The sensor data for generating the sensed maps may originate from any type of optical sensor that generates and returns intensity measurements for the reflectivity of a reflected signal and height measurements for the objects that reflected the reflected signal. Non-limiting examples of the optical sensors used for generating the sensed maps include a LiDAR sensor, a radar sensor, and a Realsense® sensor, among others. The map localizer aligns and compares the sensed maps against pre-stored digital maps to iteratively estimate the location of the truck 102.

After the autonomy system 150 determines the location of the truck 102 with respect to the digital map features (e.g., location on the road 114, upcoming intersections, road signs 132, etc.), the operating module of the autonomy system 150 can plan and execute maneuvers and/or routes with respect to the features of the digital map. The operating module of the autonomy system 150 includes software programming that makes decisions about how the truck 102 should move or navigate through the environment 100 to get to a goal or destination. The operating module may consume information from the perception module and map localizer to recognize how to navigate the environment 100 relative to the objects in the environment 100 and where the truck 102 is currently located.

Figure 2:
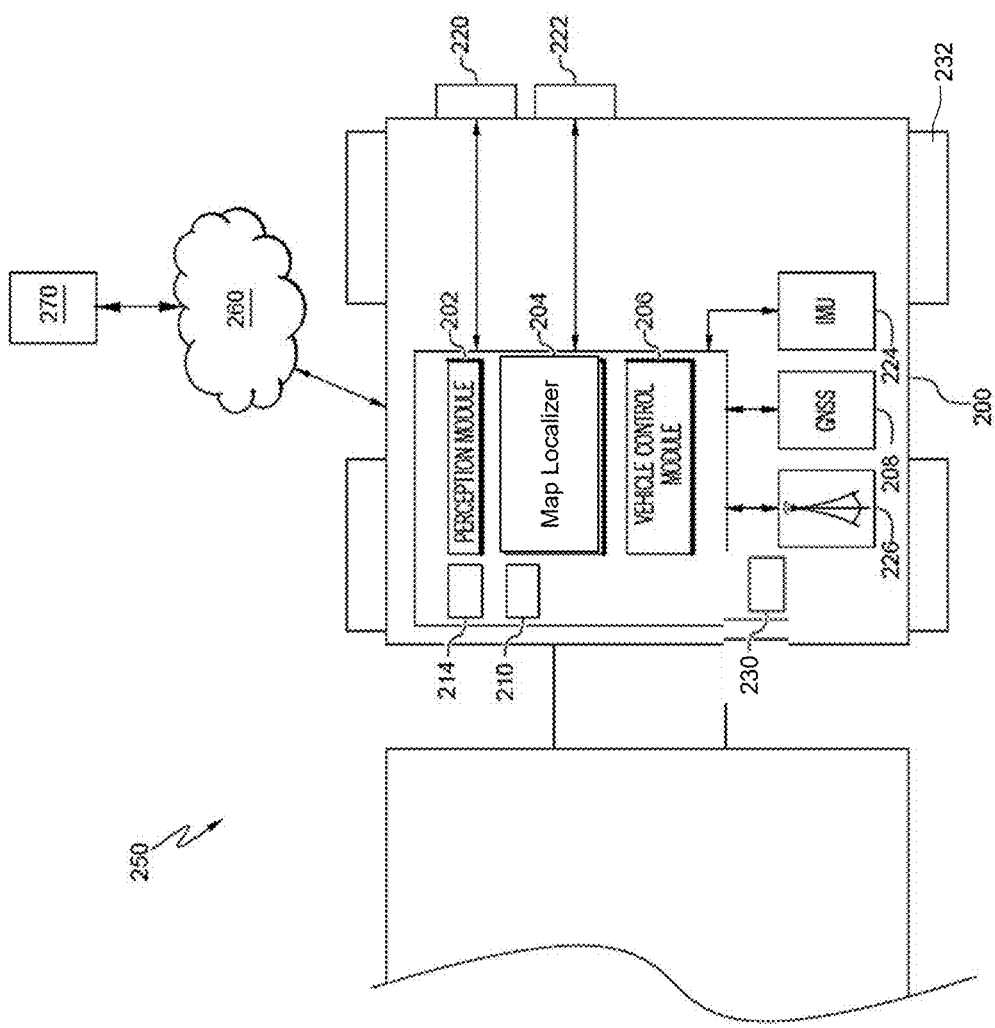
FIG. 2 is a schematic of the autonomy system of an automated vehicle, according to an embodiment.

FIG. 2 is a schematic of the autonomy system 250 of an automated vehicle, such as an autonomous truck 200 (e.g., autonomous truck 102 in FIG. 1), according to an embodiment. The autonomy system 250 may include hardware and software components for a perception system, including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a map localizer 204 (sometimes referred to as a "mapping/localization module"), and a vehicle control module 206 (sometimes referred to as an "operating module"). The various systems may serve as inputs to and receive outputs from various other components of the autonomy system 250. Embodiments of the autonomy system 250 may include more, fewer, or different components or systems, and each of the components or system(s) may include more, fewer, or different components. Additionally, the systems and components shown may be combined or distributed in various ways. As show in FIG. 1, the components of perception system aboard the automated vehicle enable the truck 102 to perceive the environment 100 within a perception radius 130. The actions of the truck 102 may depend on the extent of perception radius 130.

In some embodiments, some or all of the components of the perception system are components of an Inertial Navigation System (INS) (not shown), which may be a subsystem of the perception system or distinct from the perception system. The INS component of the truck 200 generates various data outputs for determining the position, orientation, and velocity of the truck 200. The INS receives as input, the sensor data from, for example, the IMU 224, accelerometers, and/or gyroscopes. The INS may use geolocation data received from the GNSS, though the INS need not rely on external data references and could rely upon the sensor data of the truck 200. In operation, the INS provides continuous, accurate, and real-time location-related information about a vehicle state (or "pose") with respect to a global reference frame ("global pose") or local reference frame ("local pose"). The map localizer 204 receives the global pose data or local pose data from the INS for estimating the location of the truck 200.

The camera system 220 of the perception system may include one or more cameras mounted at any location on the truck 200, which may be configured to capture images of the environment surrounding the truck 200 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., forward of the truck 200) or may surround 360-degrees of the truck 200. In some embodiments, the image data generated by the camera system(s) 220 may be sent to the perception module 202 and stored, for example, in memory 214. In some embodiments, the image data generated by the camera system(s) 220, as well as any classification data or object detection data (e.g., bounding boxes, estimated distance information, velocity information, mass information, etc.) generated by the object tracking and classification module 230, can be transmitted to the remote server 270 for additional processing (e.g., correction of detected misclassifications from the image data, training of artificial intelligence models, etc.).

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together for a sensed map or sub-map(s). In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222, radar system 232, and the camera system 220 may be referred to herein as "imaging systems."

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data). The sensors or processors of the autonomy system may generate certain measurements using reflections returns, such as height measurements or reflective intensity measurements ("reflectivity measurements").

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with map localizer 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the map localizer 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to/from a remote server 270). The wireless connection may be a wireless communication signal (e.g., Wi-Fi, cellular, LTE, 5G). In some embodiments, the transceiver 226 may be configured to communicate with external network(s) via a wired connection, such as, for example, during initial installation, testing, or service of the autonomy system 250 of the truck 200. The network connection may be used to download, via the one or more networks 260, and install various lines of code in the form of digital files (e.g., digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260 and updates which would otherwise be sent from the network 260 to the truck 200 may be stored locally at the truck 200 and/or at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the autonomy system 250 detects differences in the perceived environment with the features on a digital map, the truck 200 may update the network 260 with information, as described in greater detail herein.

The processor 210 of autonomy system 250 may be embodied as one or more of a data processor (e.g., CPU, GPU, FPGA), a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck 200. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck. Various other known circuits may be associated with the autonomy system 250, including signal-conditioning circuitry, communication circuitry, actuation circuitry, and other appropriate circuitry.

The memory 214 of autonomy system 250 includes non-transitory machine-readable storage configured to store data and/or software routines that assist the autonomy system 250 in performing the various functions of the autonomy system 250, such as the functions of the perception module 202, the map localizer module 204, the vehicle control module 206, and the object-tracking and classification module 230, among others. Further, the memory 214 may also store data received from various inputs associated with the autonomy system 250, such as perception data from the perception system. For example, the memory 214 may store image data generated by the camera system(s) 220, as well as any classification data or object detection data (e.g., bounding boxes, estimated distance information, velocity information, mass information) generated by the object tracking and classification module 230.

As noted above, perception module 202 may receive input from the various sensors, such as camera system 220, LiDAR system 222, GNSS receiver 208, and/or IMU 224 (collectively "perception data") to sense an environment surrounding the truck and interpret the perception data. To interpret the surrounding environment, the perception module 202 may identify and classify objects or groups of objects in the environment. For example, the truck 202 may use the perception module 202 to identify one or more objects (e.g., pedestrians, vehicles, debris, etc.) or features of the roadway (e.g., intersections, road signs, lane lines, etc.) before or beside a vehicle and classify the objects in the road. In some embodiments, the perception module 202 may include an image classification function and/or a computer vision function. In some implementations, the perception module 202 may include, communicate with, or otherwise utilize the object tracking and classification module 230 to perform object detection and classification operations.

The perception system may collect the various types of perception data via the various corresponding types of sensors. The perception data may represent the perceived environment surrounding the vehicle, for example, and may be collected using aspects of the perception system described herein. The perception data can come from, for example, one or more of the LiDAR system 220, the camera system, and various other externally-facing sensors and systems on board the truck 200 (e.g., GNSS receiver 208). For instance, on a truck 200 having a LiDAR 220 or radar system, the LiDAR 220 and/or radar systems may collect perception data. As the truck 200 travels along the roadway, the system 250 may continually receive data from the various components of the system 250 and the truck 200. The system 250 may receive data periodically and/or continuously.

With respect to FIG. 1, the truck 102 may collect perception data that indicates presence of the lane lines 116, 118, 120. Features perceived by the vehicle should generally track with one or more features stored in a digital map (e.g., in the map localizer 204). Indeed, with respect to FIG. 1, the lane lines that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario, the vehicle approaches a new bend 128 in the road 114 that is not stored in any of the digital maps onboard the truck 102 because the lane lines 116, 118, 120 have shifted right from original positions 122, 124, 126.

The system 150 may compare the collected perception data with stored data. For example, the system 150 may identify and classify various features detected in the collected perception data from the environment 100 with the features stored in a digital map. For example, the detection systems of the system 150 may detect the lane lines 116, 118, 120 and may compare the detected lane lines 116, 118, 120 with stored lane lines stored in a digital map.

Additionally, the detection systems of the system 150 could detect the road signs 132a, 132b and the landmark 134 to compare such features with features in a digital map. The features may be stored as points (e.g., signs, small landmarks, etc.), lines (e.g., lane lines 116, 118, 120, edges of the road 114), or polygons (e.g., lakes, large landmarks 134) and may have various properties (e.g., style, visible range, refresh rate, etc.), which properties may control how the system 150 interacts with the various features. Based on the comparison of the detected features with the features stored in the digital map(s), the system 150 may generate a confidence level, which may represent a confidence of the truck 100 in a location with respect to the features on a digital map and hence, an actual location of the truck 100.

With reference to FIG. 2, the image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module (e.g., the object detection and classification module 230) that may be communicatively coupled to a repository of images or image data (e.g., visual data, point cloud data), which may be used to detect and classify objects and/or features in real time image data captured by, for example, the camera system 220 and the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size). The computer vision function may be embodied by a software module (e.g., the object detection and classification module 230) that may be communicatively coupled to a repository of images or image data (e.g., visual data; point cloud data), and may additionally implement the functionality of the image classification function.

The map localizer 204 receives the perception data to estimate the current location of the truck 200. Using the perception data from certain sensors, the map localizer 204 generates one or more sensed maps, which the map localizer 204 compares against one or more digital maps stored in the map localizer 204 to determine where the truck 200 is in the world (as global context in a global frame of reference) and/or determine where the truck 200 is on the digital map (as local context in a local frame of reference). For instance, the map localizer 204 may receive the perception data from the perception module 202 and/or directly from the various sensors sensing the environment surrounding the truck 200 and generate the sensed map(s) representing the sensed environment. The map localizer 204 may correlate features of the sensed map (e.g., digital representations of the features of the sensed environment) against details on the one or more digital maps (e.g., digital representations of the features of the digital map), such that map localizer 204 aligns the sensed map with the digital map. The map localizer 204 then identifies similarities and differences of the sensed map and digital map in order to estimate the location of the truck 200.

The digital map includes a computer-readable data file or data stream representing the details about a geographic locale, which may occur at various levels of details. The digital map includes, for example, a raster map, a vector map, and the like. The digital maps may be stored locally on the truck 200 and/or stored and accessed remotely. In some embodiments, the truck 200 deploys with sufficiently stored information in one or more digital map files to complete a mission without connection to an external network during the mission. In some embodiments, a centralized mapping system or other storage location is accessible, via the network 260, for updating the digital map(s) of the map localizer 204.

In some implementations, the digital map may be built through repeated observations of operating environments of past trips using any number of trucks 200 and/or other vehicles with similar functionality. For instance, the truck 200, a specialized mapping vehicle, a standard automated vehicle, or another vehicle, can run a route several times and collect the location of all targeted map features relative to the position of the vehicle conducting the map generation and correlation. In some cases, these repeated observations can be averaged together in a known way to produce a highly accurate, high-fidelity digital map. This generated digital map can be provided to each truck 200 (or other automated vehicle) via the network 260 before the truck 200 departs on the current trip. The autonomy system 250 of the truck 200 stores the digital map data into an onboard data storage, accessible to the map localizer 204 of the truck 200. Hence, the truck 200 and other vehicles (e.g., a fleet of trucks similar to the truck 200) can generate, maintain (e.g., update), and use the generated maps when conducting a mission or trip.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck. For example, once the systems on the truck have determined its location with respect to map features (e.g., intersections, road signs, lane lines, etc.) the truck may use the vehicle control module 206 and its associated systems to plan and execute maneuvers and/or routes with respect to the features of the environment. The vehicle control module 206 may make decisions about how the truck will move through the environment to get to the goal or destination as the truck 200 completes the mission. The vehicle control module 206 may consume information from the perception module 202 and the map localizer 204 to know where the truck 200 is located relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck 200. The steering system may be any combination of mechanisms configured to adjust the heading or direction of the truck 200. The brake system may be, for example, any combination of mechanisms configured to decelerate the truck 200 (e.g., friction braking system, regenerative braking system). The vehicle control module 206 may be configured to avoid obstacles in the environment surrounding the truck and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

Figure 3:
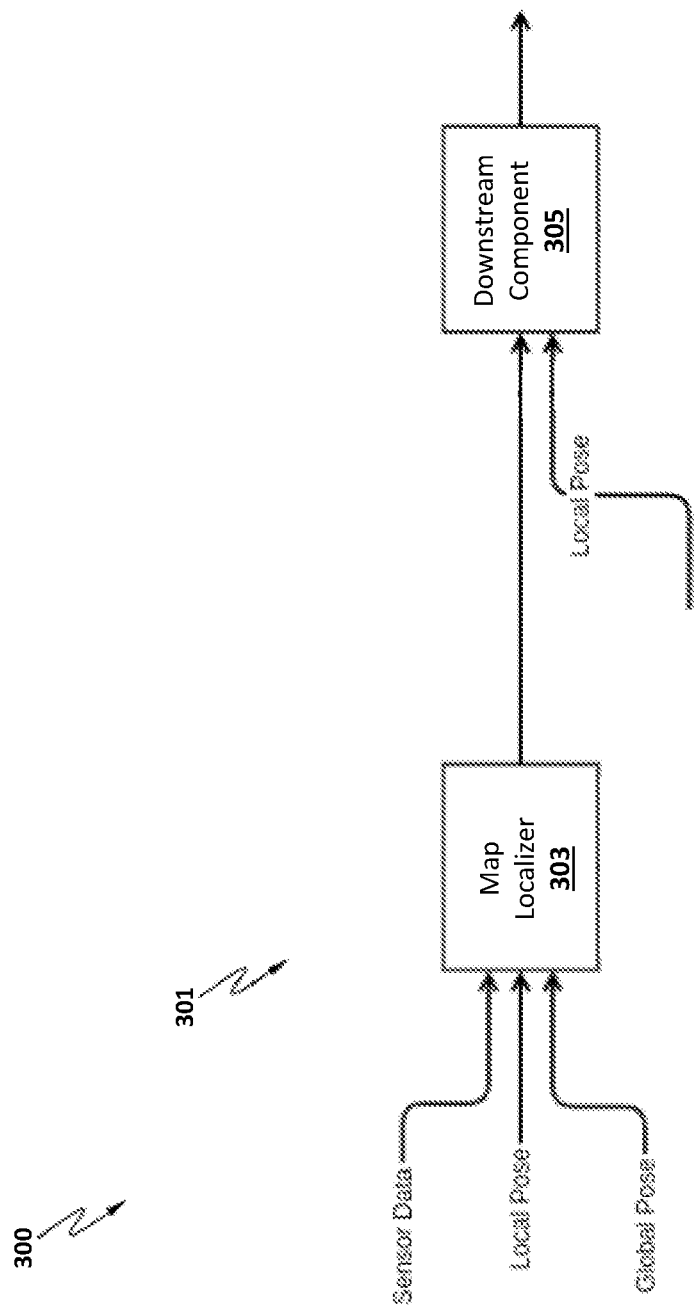
FIG. 3 shows data flow among components of an autonomy system of an automated vehicle for estimating a location of the automated vehicle using particles and a particle filter, according to an embodiment.

FIG. 3 shows data flow among components of an autonomy system 301 of an automated vehicle 300 for estimating a location of the automated vehicle 300 using particles and a particle filter, according to an embodiment. The autonomy system 301 includes a map localizer 303 and any number of downstream components 305 (e.g., vehicle control module 206). The autonomy system 301 couples to various sensors and geolocation devices (e.g., GNSS antennas) that obtain geolocation data from geolocation systems (e.g., GNSS). The autonomy system 301 receives various types of data from the sensors and the geolocation systems that the map localizer 303 references to determine the location of the automated vehicle 300 (where such data is sometimes referred to as "location-related data"). The downstream component 305 ingest certain outputs produced by the map localizer 303, where the downstream components 305 could be a component of the automated vehicle 300, the autonomy system 301, or an external data computing resource (e.g., downstream process executed by a remote server; storage at a remote non-transitory data storage).

The map localizer 303 includes hardware and software components of the autonomy system 301 for estimating the location of the automated vehicle 300. The map localizer 303 ingests the various types of location-related data (e.g., sensor data, geolocation data), gathered by the autonomy system 301 from the onboard perception sensors or geolocation systems. The sensors include any type of sensor that generates perception information based upon signal reflections, where the senor may generate sensor data containing reflectivity measurements and height measurements, among others. Non-limiting examples may include LiDAR sensors, radar sensors, and Realsense® sensors, among others. The location-related data may include a local pose and a global pose. The map localizer 303 may gather and use the location-related data to generate various location-related estimates or corrections, among other types of data outputs.

The map localizer 303 includes processor-executed functions, such as map localization functions, of the autonomy system 301 that ingest the location-related data from various data sources. The map localizer 303 may output corrected or estimated location data for the downstream components 305. The data sources may include hardware or software components of the automated vehicle 300 that receive, derive, or otherwise generate the location-related data for the map localizer 303. For instance, the location-related data may include sensor data that receives sensor data generated by a particular type of sensor of the 300, such as the sensor data collected from one or more LIDAR sensors or other types of perception sensors of the automated vehicle 300. The location-related data may further include, for example, the local pose data and the global pose data, which indicate a local position or global position of the automated vehicle 300, including, for example, geolocation data and/or motion data reported from components of an INS (not shown) of the autonomy system 301, the GNSS devices, or other perception sensors of the automated vehicle 300.

The local pose data includes, for example, a position, orientation, and velocity data of the automated vehicle 300 relative to a local reference frame. In the INS components of the automated vehicle 300, inertial sensors (e.g., IMUs, accelerometers, gyroscopes) continuously measure sensor inputs and generate metrics, such as the automated vehicle's 300 linear acceleration and angular velocity. By generating and integrating these metrics over time, the INS may compute the local pose as, for example, the automated vehicle's current position, orientation (roll, pitch, and yaw angles), and velocity, which the map localizer 303 uses for the map localization functions for estimating the automated vehicle's 300 current location. The map localizer 303 generally combines the INS data (e.g., local pose data) with the other sensor data (e.g., LiDAR, optical sensor data). The map localizer 303 or other downstream components 305 of the autonomy system 301 ingest the local pose data for the map localization functions, for and vehicle navigation and control.

The global pose data includes, for example, a position, orientation, and velocity data of the automated vehicle relative to a global reference frame, such as a geographic coordinate system (e.g., latitude, longitude). The map localizer 303 uses the global pose for locating the automated vehicle within a larger geographic context, such as a global map or a navigation system. The autonomy system 301 may determine the global pose using a combination of sensor data, such as the pose data from the INS or GNSS, and optical sensors (e.g., LiDAR sensors, radar sensors). The map localizer 303 or other component of the autonomy system 301 may fuse the diverse types of sensor data by, for example, applying sensor fusion or Kalman filtering operation, allowing the autonomy system 301 to estimate the local pose and/or global pose of the automated vehicle 300.

The map localizer 303 includes several operational pipelines relative to the attributes of the sensor data referenced in the map localization function, such as the height measurement and the reflection-intensity measurement data (sometimes referred to as "reflectivity"). In operation, the map localizer 303 accumulates the location-related data proximate to the environment around the automated vehicle (e.g., within a perception range 130). In some cases, the map localizer 303 performs a point registration function capturing coordinate information of reflected signals relative to motion information reported in the local pose data from the INS. The map localizer 303 references the LiDAR data (or other sensor data) to retrieve or generate the height measurement data and the reflectivity measurement. The map localizer 303 generates the sensed map from the sensor data. The height pipeline programming of the map localizer 303 generates a height-based sub-map of the sensed map, and the reflectivity pipeline programming of the map localizer 303 generates a reflectivity-based sub-map of the sensed map.

In some implementations, the map localizer 303 generates average values for the height and reflectivity measurements across a number of successive iterations of scoring the particles or gathering the sensor data to develop an average value in logical cells (or other logical portions) of the sensed map or each particular sub-maps, where each cell is a data structure representing a portion of the sensed map or sub-map and contains one or more types of attribute information (e.g., height value, intensity value) in addition to the location information of the particle. Because each cell constitutes a generic data structure, the cells could store or include any type of attribute of the sensor data or information, such as color data projected from a camera or reflected for the particular cell.

The map localizer 303 generates the sensed map using the LiDAR sensor data or other perception data. The map localizer 303 matches (e.g., compares and aligns) the sensed map of the current LiDAR sensor data against the pre-stored base map to identify differences or similarities in the image data of the sensed map (or sub-map) and the image data of the base map, using multiple evaluation methods and a particle filter. In this way, map localizer 303 determines how to align and overlay the sensed map (or sub-map) over the base map. The map localizer 303 may generate the local sub-maps using the LiDAR data accumulated around the automated vehicle 300 over successive iterations of short interval time periods, including the height-based sensed sub-map and the reflectivity-based sensed sub-map.

The map localizer 303 generates a plurality of particles, representing estimated locations or positions of the automated vehicle in the sensed map, a particular sub-map, or the base map. The map localizer 303 executes the map localization functions for applying a particle filter to estimate, for example, the location, position, and/or orientation of the automated vehicle 300 relative to a known pre-stored base map (or scoring map), given some amount of noisy sensor data. The map localizer 303 generates the particles as two-dimensional coordinates representing the estimated location of the automated vehicle and updating the particles using the particle filter. The map localizer 303 generates the particles and applies the particle filter for localization, which includes operations for initializing, predicting, updating, resampling, and estimating outputs. The map localizer 303 generates and feeds the outputs to the downstream components 305 for navigating the automated vehicle, among other functions.

Figure 4:
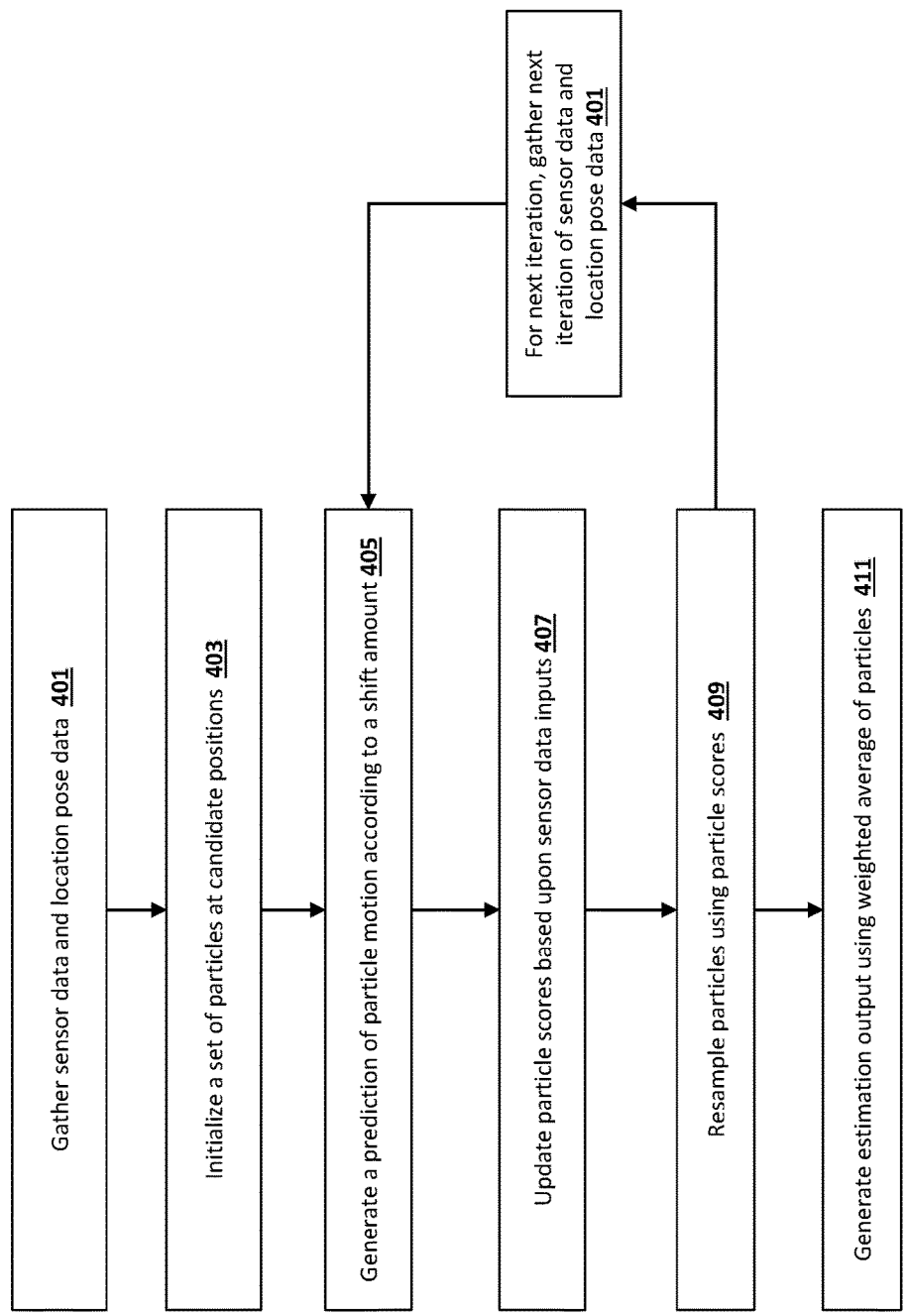
FIG. 4 shows operations of a method for localization by applying a particle filter, according to an embodiment.

FIG. 4 shows operations of a method 400 for localization by applying a particle filter, according to an embodiment. The operations of the method 400 are described as being performed by an autonomy system and map localizer of an automated vehicle, though embodiments may perform the various features and functions of the method 400 by any number of components of the automated vehicle or remote system components in communication with the automated vehicle.

In operation 401, the autonomy system gathers sensor data from reflection-based perception sensors (e.g., LiDAR) and obtains (e.g., retrieves, receives, generates) base map data. The autonomy system may obtain image data of the base map from a non-transitory machine-readable storage medium of the automated vehicle or a remote database. The autonomy system may generate or receive image data of a sensed map using the sensor data. In some cases, the autonomy system uses the sensor data to generate one or more sub-maps for particular attributes of the sensor data and the image data, such as height measurements of reflecting objects and reflectivity measurements indicating an intensity or brightness of the reflection. Optionally, the autonomy system applies one or more normalization functions on the sensor data or the image data of the sensed map.

In some embodiments, the map localizer includes software routines of operational pipelines for handling corresponding attributes of the sensed map by processing certain location-related data gathered by the autonomy system. As an example, a height pipeline generates and handles a height-based sub-map using the height measurements from the LiDAR sensor data. As another example, a reflectivity pipeline generates and handles a reflectivity-based sub-map using the reflectivity measurements from the LiDAR sensor data. The map localizer generates the sensed map from the LiDAR data, though the pipelines of the map localizer may use other types of sensor data relevant to the particular attribute pipeline.

In some embodiments, the map localizer applies a transformation function (e.g., Fourier transform) on the sensor data, sensed map (or sub-map), and/or the base map, thereby generating a transformed sensed map and a transformed base map. The map localizer generates or receives the sensed map and base map in a spatial domain. The transformation function transforms the senses map and the base map to the frequency domain. The map localizer or other component of the autonomy system generates the transformed sensed map and a transformed base map by applying one or more transformation functions, such as a Fourier transformation function (e.g., Fast Fourier Transform (FFT) or Short Fourier Transform (SFT)). The autonomy system applies the transform function on the image data of the sensed map and base map, to transform the image data from the spatial domain to the frequency domain.

In operation 403, the autonomy system INITIALIZES a set of particles at candidate positions. The map localizer initializes a set of particles as two-dimensional candidates or initial location particles, each representing a possible location (X, Y) and/or pose (position and orientation), which may include a local pose and/or global pose of the automated vehicle in the sensed map or base map. The map localizer may ingest global pose data from an INS, indicating a global position of the automated vehicle at a broader, geolocation context frame of reference. The map localizer may generate the initial location particles around the global position of the automated vehicle, indicated by the global position information (of global pose data) reported by, for example, the INS of the autonomy system or GNSS system used by the autonomy system. The map localizer generates the initial number of particles according to pre-configurations of an administrator, based on a desired level of accuracy of the localization. The map localizer may generate the particles for random distribution and/or around the initial estimate global pose of the automated vehicle.

In operation 405, the map localizer generates a PREDICTION of particle motion according to a shift amount. At a given interval, the map localizer predicts the motion of each particle based on various types of data (e.g., steering angle and speed) received from, for example, the INS, IMU, or control module, among other components of the automated vehicle. The map localizer moves or "shifts" the particles to new positions in a mapping space by a shift amount consistent with, for example, the vehicle's motion. For instance, the map localizer predicts the particle population movement (or shift) between successive iterations of data-gathering and scoring intervals, based upon a delta (or difference) in the motion or position of the automated vehicle reported in the local pose data from the INS. As an example, the autonomy system applies the shifts on the sensed map, sub-map(s), base map, or scoring map. The image data of the sensed map and the base map include image information or pixel information that may be characterized or represented by a two-dimensional coordinate plane (e.g., X, Y; latitude, longitude) or three-dimensional coordinate plane (e.g., X, Y, Z; latitude, longitude, height). In some cases, the image data image data of the sensed map and the base map include image information or pixel information that may be characterized by the autonomy system to include rotation or yaw estimates of the automated vehicle's orientation. To apply the shift on the image data of the sense map, the autonomy system shifts the pixels of the two-dimensional plane by a shift amount. By applying the shift to the particle population according to the estimated shift amount, the map localizer keeps high-scoring particles from the previous iteration as some of the best localization estimates.

In some embodiments, the map localizer implements a phase correlation approach (e.g., SHREK or SHREK2 functions) to scoring particles. The map localizer may implement the phase correlation functions for determining the shift amount for predicting the motion of the particles. The autonomy system employs the phase correlation operation for determining a most likely relative shift between the image data of the transformed sense map and the image data of the transformed base map. The correlation scoring map is a two-dimensional image that represents the correlation between the two images at different shifts between the image data of the maps.

The map localizer generates the correlation scoring map using the image data of the transformed sensed map (in the frequency domain) overlaying the image data of the transformed base map (in the frequency domain). The map localizer algorithmically combines the frequency domain maps to generate the correlation scoring map by, for example, convolving the image data of the frequency domain maps and/or multiplying a complex conjugate of the transformed based map by the transformed sensed map (or complex conjugate of the transformed sensed map), and taking an inverse Fourier transform of the result. A peak in the correlation scoring map represents a relative shift between the image data of the frequency domain maps. The map localizer uses the correlation scoring map for the prediction operation (of operation 405). Additionally or alternatively, the map localizer uses the correlation scoring map for scoring the particles when updating the particle scores (as in operation 407).

In some embodiments, the autonomy system applies a phase shift function (e.g., Dirac delta function) on the transformed sense map, such that the phases of the transformed base map and the transformed sense map are shifted, yet the phase magnitudes of the transformed base map and the transformed sense map remain similar. The autonomy system may compute the phase shift for performing the shift function according to any number of preconfigured techniques. In some cases, for example, the autonomy system may compute the phase difference amount (to apply as the phase shift) using a normalized cross-power spectrum (CPS). In this example, the autonomy system computes the phase difference amount by multiplying the transformed base image with the complex conjugate of the transformed sense image and normalizing the product, where the phase difference is the quotient resulting from normalizing the product. The autonomy system may determine the phase difference amount by determining the inverse transform of the phase shift function (e.g., inverse Fourier transform of the shifted Dirac delta function), and then locating the peak (or greatest) phase shift.

The phase-shift function (e.g., Dirac delta function) indicates a point in space or time that has been relocated from an original position. By taking the inverse transform of the result of the shifted function, the autonomy system obtains the image data of the correlation map in the spatial domain. In some cases, the image data of the correlation map represents a score or likelihood of a specific pixel at a point (X, Y) as being the center pixel of a shifted image.

As an example of the method, the autonomy system computes the Fourier transform of each image of the sensed map and base map to generate the transformed sensed map and transformed base map. The autonomy system then generates the correlation map. The autonomy system multiplies the complex conjugate of the transformed sensed map by the transformed base map (or the complex conjugate of the transformed base map), and then determines an inverse transform of the product, thereby generating the correlation map, which includes the two-dimensional image representing the level of similarity or correlation between the image data of the sense map and the base map at the different phase shift(s). The autonomy system identifies the peak value of the correlation map as corresponding to the relative shift (e.g., phase difference applied as the phase shift amount) between the transformed sense map and the transformed base map.

In some implementations, the autonomy system may apply a low-pass filter, such that the autonomy system matches only low frequencies. In some circumstances, generating the correlation scoring map by computing the inverse transform of the phase-shift function may result in a noisy image, where the image data of the correlation map contains a relatively high amount of noise, potentially representing false positives of edges, objects, or other details. As mentioned, when image processing in the frequency domain, the transformed image data includes high-frequency components and low-frequency components, where the high-frequency components in the image data correspond to fine details (e.g., edges) and the low-frequency components correspond to smooth regions and overall color or brightness. The autonomy system may apply the low-pass filter on the correlation map, the transformed sense map, and/or the transformed base map, such that the autonomy system compares and matches using only low frequencies in the transformed images, thereby filtering the high-frequency noise of the high-frequency components from the resulting correlation map image or from the compared transformed images (e.g., transformed base map and transformed sense map). After filtering the high-frequency noise, the phase correlation scoring map contains a general shape of the image, which may be in the frequency domain or transformed to the spatial domain. Further description of additional or alternative types of scoring maps is found below.

In operation 407, the map localizer UPDATES the particle weights for scoring the particles based upon sensor data inputs. The map localizer uses sensor data, such as LiDAR or camera images, to compute or update the particle weight scores of the current particles. The particles are scored based on the corresponding weights, which represent the likelihood of each particle being the correct local localization of the vehicle. The map localizer updates the weights during the update step (in current operation 407). The map localizer uses sensor measurements, such as those from LiDAR or other onboard sensors, to calculate the similarity between the particle's location information (e.g., coordinates for a base map or scoring map) and the actual sensor observations in the sensed map, sub-map(s), or scoring map.

The map localizer computes a likelihood of an observed sensor data given the pose of each particle in the map. Particles situated in the scoring maps that are more consistent with the sensor data will have higher weights. The map localizer iteratively updates the particles at the given interval. The map localizer uses the sensor data (e.g., LiDAR or radar images) to determine and update relative weighting values of the particles. The map localization functions compute particle or candidate scores representing the likelihood of observed sensor data (e.g., how likely the observed sensor data should occur) given the sensor data and/or the local pose at each particle in the sensed map, base map, or scoring map. The map localizer assigns higher weights to the particles having poses more consistent with the sensor data (e.g., particles having higher particle scores). The map localizer calculates each particle's score using a combination of evaluation operations applied to the height-based sub-map and the reflectivity-based sub-map.

Each particle includes, or is otherwise associated with, position information indicating the position of the particle (e.g., coordinate X, Y; geographic lat, long; yaw, rotation), as well as sensor measurements occurring at the particle. The map localizer computes and assigns each particle's position score by computing a difference metric between particle sensor measurements of the sensed map or the sub-maps compared against the sensor measurements of base maps (e.g., for both the reflectivity and height measurements). In some cases, prior to scoring the particles, the map localizer generates a scoring map using the sensed map, sub-map(s), and base map, according to one or more particle-filtering processes described herein for generating the scoring map, where the map localizer may use the scoring map for generating or scoring the particles when applying the particle filter. In some implementations, the map localizer performs the actual scoring function by removing bias between the image data of the maps (e.g., image data of the sensor sub-map; image data of the base map) and computing an average pixel-wise product of the two images. In some implementations, the programming of each pipeline generates or obtains the corresponding sub-map and logically overlays the sub-map on top of the base map at a given candidate position of a particle to evaluate the given particle. For each particle, the pipeline calculates a particle score as a difference or similarity value based upon the position of the particular particle. The particle evaluation occurs by overlaying the sensor sub-map at the candidate position on the base map and applying a scoring function to compute the resulting particle score.

Optionally, the map localizer applies a local normalization filter on the position information of each particle, thereby minimizing the influence of raw value disparities and increasing influence of edges. In this way, the normalization mitigates the effects of wet/dry roads, fading pavement, and different LiDAR sensing models.

In some embodiments, the map localizer implements the standard image convolution functions for determining the particle scores. The map localizer generates a standard image-convolution scoring map representing a combination of the sensed map overlying the base map. The autonomy system generates the standard image-convolution scoring map by applying one or more convolutional functions on the image data of the sensed map and on the image data of the base map and/or by multiplying the complex conjugate (in the frequency domain) of the base map by the sensed map (or complex conjugate of the sensed map). In some cases, the autonomy system determines an amount of shift by computing a level of similarity or a covariance based upon a distance or deviation of pixels of the image data of the standard image-convolution scoring map or by comparing the sensed map or sub-map against the base map. A higher similarity value indicates a better or near-perfect match. The autonomy system may compute the particle scores for each particle by comparing the location information or other types of data of the particle against the sensed data in the sub-maps and/or the combination score map.

As mentioned, in some embodiments, the map localizer implements the phase correlation approach (e.g., SHREK or SHREK2 functions) for scoring the particles. The map localizer may implement the phase correlation functions for determining the shift amount for predicting the motion of the particles. The map localizer generates the correlation scoring map using the image data of the transformed sensed map (in the frequency domain) overlaying the image data of the transformed base map (in the frequency domain). The map localizer algorithmically combines the frequency domain maps to generate the correlation scoring map by, for example, convolving the image data of the frequency domain maps and/or multiplying a complex conjugate of the transformed based map by the transformed sensed map (or complex conjugate of the transformed sensed map), and taking an inverse Fourier transform of the result.

In addition, the map localizer uses the correlation scoring map for scoring the particles when updating the particle scores (as in the current operation 407). The map localizer compare the location information or other types of data of the particles against the sensed data in the sub-maps and/or the correlation scoring map.

In some embodiments, the map localizer implements a phase correlation approach (e.g., SHREK2) that combines the correlation scoring map with the standard image-convolution map based upon entropy scores representing the relative confidence of the combined maps. The autonomy system computes the entropy score for the phase correlation score map and for the standard image convolution map. The autonomy system combines the correlation scoring map and the standard image-convolution map based on determining the comparative entropy weights or ratio calculated for the standard score map and the correlation score map.

Each entropy score indicates a level of uncertainty in the accuracy of the score map, which may likewise indicate a level of confidence in the accuracy of the score map low entropy indicates low uncertainty and high confidence. A better entropy score (e.g., comparatively lower entropy score) indicates comparatively higher confidence. As such, the autonomy system assigns one or more weights to the image data of the score map having the comparatively better entropy score (e.g., comparatively lower entropy score), because the autonomy system may assume more confidence in the accuracy of that particular score map. In some implementations, the autonomy system computes the ratio of the each entropy score to determine the better entropy score and assign the comparative weights. In some implementations, the autonomy system may normalize the entropy scores relative to one another to determine the comparative weights.

The autonomy system generates a merged map by merging the standard image-convolution map and the correlation score map, based upon the comparative weights assigned to the scoring maps using the comparative entropy scores (indicating comparative confidence levels). As an example, each pixel is on a scale of, for example, 0-255, indicating a level of brightness or boldness, based upon the comparative level of confidence of the image data at that pixel, biased towards the score map having the better entropy score using the ratio. As an example, if the weight of the standard score map is 0.25 and the weight of the correlation score map is 0.75, then then the autonomy system multiples the standard score map data by 0.25 and multiplies the correlation score map data by 0.75 and combine the score map images to generate the merged map. If the autonomy system determines a brightness value for a particular pixel of the standard score map is 1, then the weighted brightness value is 1*0.25=0.25; and if the autonomy system determines the brightness value of the same pixel of the correlation score map is 2, then the weighted brightness value is 2*0.75=1.5. The brightness value for the pixel of the merged map will be 1.5+0.25=1.75. In this way, the merged map represents the combination of the standard image-convolution map and the phase correlation map in which pixels having preferable sensed data points are accentuated or otherwise used for determining the particle scores.

To score the particles, the map localizer may, for example, compare the location information or other types of data of the particles against the sensed data of the sensed map, sensed sub-map(s), and/or the merged map.

In operation 409, the map localizer RESAMPLES particles based upon particle scores. The map localizer iteratively resamples the particles at the given interval. The map localizer removes particles having lowest scores or lowest percentile score representing the least likely particle poses (least likely location or pose of the automated vehicle). The map localizer duplicates the particles having highest scores or highest percentile score representing the more likely particle poses (more likely location or pose of the automated vehicle). The map localizer generates the new child particles as duplicates at or nearby the corresponding parent particles. In this way, the resampling operations may prevent particle depletion (when only a few particles have significant weights) and maintains a diverse set of particles tailored or focusing on the most likely poses. For instance, the map localizer culls the particle population by removing the lowest scoring percentile of the population (e.g., remove the particles having particle or candidates scores in the lowest 10% of scores). In some implementations, the map localizer generates a number of new particles according to a mutation Probability Density Function (PDF), where the map localizer generates more child particles for the higher-scoring parent particles. In this way, the map localizer generates more particles using the best and most likely particles, while removing the least likely particles. In some implementations, the map localizer seeds or generates additional random particles around the global pose (e.g., Global Position) reported from the INS. In this way, the map localizer generates the synthetic noise in the image for robustness.

For instance, after scoring each candidate position (as in operation 407) at the current iteration, the map localizer removes low-scoring particles from the population of particles of the current interval, where the low scoring particles are within a lowest percentile threshold of particles or have scores failing to satisfy a particle score threshold. In some cases, the map localizer randomly or pseudo-randomly generates any number of new particles (sometimes referred to as "child" particles) within a preconfigured distance around higher scoring particles (sometimes referred to as "parent" particles). For a given parent particle, the map localizer generates a number of new child particles proportional to the particle score of the particular parent particle. Additionally or alternatively, in some cases, the map localizer randomly generates new particles without regard to any other particles. In this way, the random floating particles may represent noise to provide robustness in the map localization operations.

Before a next iteration of method 400 or before generating an estimate output (as in operation 403), the map localizer executes the prediction operation (as in the operation 407) that shifts the current population of particles according to an amount of estimated travel of the automated vehicle. The map localizer shifts the population of particles such that the highest scoring particles of the current or prior iteration are, again, among the highest scoring particles representing the best estimates for the location of the automated vehicle in the subsequent iteration. The map localizer resamples the particles (as in operation 409) for the current iteration and before the next iteration. The map localizer eliminates bad estimates by removing the lowest-scoring particles and accentuates good estimates by duplicating the highest-scoring particles. The map localizer may also include the random floating particles to provide the added noise. In this way, the distribution of the particles generated across successive iterations evolve from an initial distribution of the particles for the estimated locations of the automated vehicle, to an evolved particle distribution that tightly approximates the actual location of the automated vehicle within the sense map, sub-map(s), and/or base map.

In operation 409, the map localizer generates an ESTIMATION OUTPUT for an estimated location using a weighted average of the particles as a unified location estimate. The map localizer computes the estimated location or pose of the automated vehicle. The map localizer, for example, determines the estimated location or pose of the automated vehicle by taking a weighted average of the particles' locations or poses. The autonomy system may feed this estimated location to other downstream operational components of the autonomy system, such as navigation and control components of the automated vehicle. As an example, map localizer generates the estimated location as the generates the unified location estimate by computing the weighted average of the particles having scores in a top percentile of the population (e.g., computing averages of location or pose data of the particles having scores in the 20%). In some implementations, the autonomy system performs a safety check to confirm that there is only one cluster in the lateral direction to inhibit ambiguities.

The map localizer and/or the autonomy system may publish the unified location estimate, among other data outputs, for consumption by the one or more downstream components of the autonomy system.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for managing location information in autonomous vehicles, the method comprising:
    generating a plurality of particles representing a plurality of candidate locations of the autonomous vehicle;
    generating, by a processor of an autonomous vehicle, a sensed map based upon sensor data from one or more sensors of the autonomous vehicle;
    obtaining, by the processor, a base map from a non-transitory storage medium;
    generating, by the processor, a first scoring map based upon image data of the sensed map in a spatial domain overlaying image data of the base map in the spatial domain, the first scoring map including first scores indicating first likelihoods of the autonomous vehicle being at the candidate locations;
    applying, by the processor, a transform function on the image data of the sensed map to generate the image data of a transformed sensed map in a frequency domain, and on the image data of the base map to generate the image data of a transformed base map in the frequency domain;
    generating, by the processor, a second scoring map in the frequency domain based upon the image data of the transformed sensed map overlaying the image data of the transformed base map, the second scoring map including second scores indicating second likelihoods of the autonomous vehicle being at the candidate locations;
    updating, by the processor, an estimated location of the autonomous vehicle, by:
        scoring the plurality of particles based on at least one of the first scores or the second scores; and
        determining the estimated location as a weighted average of the candidate locations based on at least one of the first scoring map or the second scoring map; and
    controlling operation of the autonomous vehicle based on the estimated location of the autonomous vehicle.

2. The method according to claim 1, further comprising identifying, by the processor, a relative shift between the transformed sensed map and the transformed base map, the relative shift corresponds to a peak value in the image data of the second scoring map in the frequency domain.

3. The method according to claim 1, wherein the processor applies the first scoring map and the second scoring map to update the estimated location, and wherein applying the first scoring map and the second scoring map includes:
    generating, by the processor, a first entropy score for the first scoring map;
    generating, by the processor, a second entropy score for the second scoring map; and
    generating, by the processor, a third scoring map by combining the image data of the first scoring map and the image data of the second scoring map by applying a relative weight based on the first entropy score and the second entropy score,
    wherein the processor applies the third scoring map against the plurality of particles representing candidate locations for the autonomous vehicle.

4. The method according to claim 1, further comprising, for each particle of the plurality of particles, generating, by the processor, a particle score by comparing location data of the particle against the sensed data of the at least one of the first scoring map or the second scoring map.

5. The method according to claim 1, wherein the processor generates the first scoring map by applying one or more convolutional operations on the image data of the sensed map and the image data of the base map.

6. The method according to claim 5, wherein generating the first scoring map includes determining, by the processor, a correlation value for the first scoring map based upon an amount of pixel similarity between the image data of the sensed map and the image data of the base map.

7. The method according to claim 1, further comprising determining, by processor, an amount of shift between the transformed sensed map and the transformed base map.

8. The method according to claim 1, wherein generating the second scoring map includes applying, by the processor, a high-frequency filter on the image data of the second scoring map for removing a portion of the image data of the second scoring map indicating a frequency above a noise threshold.

9. The method according to claim 1, wherein generating the second scoring map includes, applying, by the processor, a second transform function on the second scoring map to transform the second scoring map from the frequency domain to the spatial domain.

10. The method according to claim 1, wherein a first pipeline generates a height sub-map of the sensed map using height measurements of the sensor data, and wherein a second pipeline generates a reflectivity sub-map of the sensed map using reflectivity measurements of the sensor data.

11. A system for managing location information in autonomous vehicles, comprising:
one or more sensors of an autonomous vehicle for generating sensor data; and
a processor coupled to the one or more sensors and configured to:
generate a plurality of particles representing a plurality candidate locations of the autonomous vehicle;
generate a sensed map based upon sensor data from the one or more sensors;
obtain a base map from a non-transitory storage medium;
generate a first scoring map based upon image data of the sensed map in a spatial domain overlaying image data of the base map in the spatial domain, the first scoring map including first scores indicating first likelihoods of the autonomous vehicle being at the candidate locations;
apply a transform function on image data of the sensed map to generate the image data of a transformed sensed map in a frequency domain, and on the image data of the base map to generate the image data of a transformed base map in the frequency domain;
generate a second scoring map in the frequency domain based upon the image data of the transformed sensed map overlaying the image data of the transformed base map, the second scoring map including second scores indicating second likelihoods of the autonomous vehicle being at the candidate locations;
update an estimated location of the autonomous vehicle, by:
scoring the plurality of particles based on at least one of the first scores or the second scores; and
determining the estimated location as a weighted average of the candidate locations based on at least one of the first scoring map or the second scoring map; and
control operation of the autonomous vehicle based on the estimated location of the autonomous vehicle.

12. The system according to claim 11, wherein the processor is further configured to identify a relative shift between the transformed sensed map and the transformed base map, the relative shift corresponds to a peak value in the image data of the second scoring map in the frequency domain.

13. The system according to claim 11, wherein the processor applies the first scoring map and the second scoring map to update the estimated location; and wherein when applying the first scoring map and the second scoring map, the processor is further configured to:
generate a first entropy score for the first scoring map;
generate a second entropy score for the second scoring map; and
generate a third scoring map by combining the image data of the first scoring map and the image data of the second scoring map by applying a relative weight based on the first entropy score and the second entropy score,
wherein the processor applies the third scoring map against the plurality of particles representing the candidate locations for the autonomous vehicle.

14. The system according to claim 11, wherein the processor is further configured to, for each particle of the plurality of particles, generate a particle score by comparing location data of the particle against the sensed data of the at least one of the first scoring map or the second scoring map.

15. The system according to claim 11, wherein the processor generates the first scoring map by applying one or more convolutional operations on the image data of the sensed map and the image data of the base map.

16. The system according to claim 11, wherein when generating the first scoring map the processor is further configured to determine a correlation value for the first scoring map based upon an amount of pixel similarity between the image data of the sensed map and the image data of the base map.

17. The system according to claim 11, wherein the processor is further configured to determine an amount of shift between the transformed sensed map and the transformed base map.

18. The system according to claim 11, wherein when generating the second scoring map the processor is further configured to apply a high-frequency filter on the image data of the second scoring map for removing a portion of the image data of the second scoring map indicating a frequency above a noise threshold.

19. The system according to claim 11, wherein, when generating the second scoring map, the processor is further configured to apply a second transform function on the second scoring map to transform the second scoring map from the frequency domain to the spatial domain.

20. The system according to claim 11, wherein a first execution pipeline generates a height sub-map of the sensed map using height measurements of the sensor data, and wherein a second execution pipeline generates a reflectivity sub-map of the sensed map using reflectivity measurements of the sensor data.

* * * * *